# 3,031,374
FIRE RETARDANT CREOSOTE COMPOSITION
Bernard Lowell, 912 23rd Ave., Oakland, Calif.
No Drawing. Filed June 18, 1959, Ser. No. 821,102
9 Claims. (Cl. 167—38.7)

This invention relates to a composition of matter, and more particularly to a fire retardant creosote composition.

As is well known, creosote is commonly and widely employed as a coating for wood, e.g. pilings, telephone poles, and the like, to protect the same against termites and the inroads of weather elements and other rot-promoting means.

Creosote is, however, readily ignitable and combustible, and while much effort has been put forth on the part of industry in the attempt to render creosote fire retardant, to my knowledge this effort has not been successful.

The present invention has for its essential object and purpose the provision of a creosote which has been satisfactorily rendered fire retardant.

A further object of the invention is to provide a fire reardant creosote which may be applied to telephone poles, and the like, by either brushing or pressure-impregnation operations.

As examples of fire retardant creosote of my invention, the following are presented:

Example I

This was prepared by mixing together solutions A–I and B–I. Solution A–1 consisted of:

| | Percent by weight of final product |
|---|---|
| Tricresylphosphate, 400 ml. | 4.5 |
| Copper resinate, 80 gr. | 1 |
| Antimony oxide, 200 gr. | 2 |
| Chlorinated rubber, 60 gr. | -- |

The foregoing constituents were mixed together at 280–350° F. until a solution, indicated by the homogeneity of mixture was obtained. Solution B–I consisted of:

| Toluene, 1200 ml. | 13.5 |
|---|---|
| Chlorinated rubber, 380 gr. | 4 |
| Titanium oxide, 80 gr. | 1 |
| Calcium carbonate, 200 gr. | 2 |
| Latex, 400 ml. | 4.5 |

The B–I constituents were mixed together at 200° F. until a solution, again indicated by the homogeneity of the mixture, was obtained. A–I and B–I were then cooled to 60–70° F. and mixed together. To this mixture there was added:

Creosote (commercial grade), 5800 ml. _____ 67.5

The end mixture was then heated to 200° F. and agitated until it appeared homogeneous to the eye. The resultant product may be brush applied or used to impregnate wood under pressure, and it serves as an excellent fire retardant and protective wood coating of impregnant.

Example II

The following were mixed together at 280–350° F. until homogeneity was obtained:

| | Percent by weight of end product |
|---|---|
| Tricresylphosphate, 40 ml. | 40 |
| Quinine glycerophosphate, 1 gr. | 1 |
| Chlorinated rubber, 20 gr. | 19 |

This solution was then allowed to cool to 60–70° F. and to it was added:

Creosote, 40 ml. _____ 40

The end mixture was heated until homogeneous at a temperature of 200° F. The product had fine fire retardant properties.

Example III

Solution A–III consisted of the following which were mixed together until homogenous at a temperature of 200° F.:

| | Percent by weight of end product |
|---|---|
| Water, 60 ml. | 16 |
| Mono-ammonium-phosphate, 30 gr. | 8 |
| Phosphoric acid (conc.), 30 ml. | 8 |
| Antimony tri-chloride, 30 gr. | 8 |

Solution B–III consisted of the following which were mixed together until homogeneous at a temperature of 200° F.:

| Creosote, 200 ml. | 54.5 |
|---|---|
| Chlorinated rubber, 20 gr. | 5.5 |

A–III and B–III were then mixed together at 60–70° F. and heated to 200° F. until the end product was homogeneous. This product likewise proved to have fine fire retardant properties.

Example IV

Solution A–IV consisted of the following which were mixed together until homogeneous at 200° F.:

| | Percent by weight of final product |
|---|---|
| Water, 20 ml. | 11.5 |
| Antimony tri-chloride, 20 gr. | 11.5 |
| Mono-ammonium-phosphate, 20 gr. | 11.5 |

Solution B–IV consisted of the following which were mixed together until homogeneous at a temperature of 200° F.:

| Creosote, 100 ml. | 60 |
|---|---|
| Chlorinated rubber, 10 gr. | 5.5 |

A–IV and B–IV were then mixed together at 60–70° F. and then heated to 200° F. until homogeneous, the end product having desirable fire retardant properties.

Example V

Solution A–V consisted of the following which were mixed together until homogeneous at a temperature of 200° F.:

| | Percent by weight of end product |
|---|---|
| Antimony tri-chloride, 20 gr. | 11.5 |
| Phosphoric acid (conc.), 40 ml. | 23 |

Solution B–V consisted of the following which were mixed together until homogeneous at 200° F.:

| Creosote, 100 ml. | 60 |
|---|---|
| Chlorinated rubber, 10 gr. | 5.5 |

A–V and B–V were mixed together at 60–70° F. and then heated to 200° F. until homogeneous. Here, as in the previous examples, the two sub-solutions may be added together when they are at about 200° F., i.e. without pre-cooling to room temperature.

In addition to the foregoing examples, it may be stated broadly that a fire retardant creosote may be arrived at, with appropriate regard to the temperature and mixing conditions set forth hereinabove, by adding the following to 10 parts of creosote: 0.75–10 parts of tricresylphosphate; 0.5–5 parts of chlorinated rubber; 1–2 parts of antimony tri-chloride and 1–4 parts of a phosphorus compound taken from the group consisting of ammonium monophosphate and phosphoric acid. In lieu of antimony trichloride and said phosphorus compounds, there may be used 1–2 parts of antimony phosphate.

What is claimed is:
1. A fire retarding coating or impregnating composition for application to wood comprising a solution of 10 parts of creosote, from 0.5 to 5 parts of chlorinated rubber, and from 0.75 to 10 parts of a phosphorous containing compound selected from the class consisting of tricresylphosphate, monoammonium phosphate and phosphoric acid.

2. A fire retardant coating or impregnating composition for application to wood comprising a solution of 10 parts of creosote, from 0.5 to 5 parts of chlorinated rubber, from 1 to 2 parts of antimony tri-chloride, and from 0.75 to 10 parts of a phosphorous containing compound selected from the class consisting of tricresylphosphate, monoammonium phosphate and phosphoric acid.

3. A fire retarding coating or impregnating composition for application to wood comprising a solution of 10 parts of creosote, from 0.75 to 10 parts of tricresylphosphate, from 0.5 to 5 parts of chlorinated rubber, from 1 to 2 parts of antimony tri-chloride and from 1 to 4 parts of a phosphorous containing compound selected from the class consisting of monoammonium phosphate and phosphoric acid.

4. A fire retarding coating and impregnating composition for application to wood comprising 10 parts of creosote, 0.75 to 10 parts of tricresylphosphate, and 0.5 to 5 parts of chlorinated rubber.

5. A fire retarding coating and impregnating composition for application to wood comprising a solution of 10 parts of creosote, from 0.5 to 5 parts of chlorinated rubber, and from 0.75 to 10 parts of a phosphorous containing compound selected from the class consisting of tricresyl phosphate, monoammonium phosphate and phosphoric acid.

6. A fire retarding coating and impregnating composition for application to wood comprising a solution of 10 parts of creosote, from 0.5 to 5 parts of chlorinated rubber, from 1 to 2 parts of antimony tri-chloride, and from 0.75 to 10 parts of a phosphorous containing compound selected from the class consisting of tricresylphosphate, monoammonium phosphate and phosphoric acid.

7. A fire retarding coating and impregnating composition for application to wood containing about 55 parts of creosote, about 8 parts of monoammonium phosphate, about 8 parts of phosphoric acid, about 8 parts of antimony tri-chloride, about 16 parts of water, and about 5 parts of chlorinated rubber.

8. A fire retarding coating and impregnating composition for application to wood containing about 60 parts creosote, about 12 parts monoammonium phosphate, about 12 parts antimony tri-chloride, about 5 parts chlorinated rubber, and about 12 parts water.

9. A fire retarding coating and impregnating composition for application to wood containing about 60 parts creosote, about 5 parts chlorinated rubber, about 23 parts phosphoric acid, and about 12 parts antimony tri-chloride.

References Cited in the file of this patent
UNITED STATES PATENTS

| | | |
|---|---|---|
| 1,388,826 | Arent | Aug. 23, 1921 |
| 1,443,602 | Weber | Jan. 30, 1923 |
| 2,073,634 | Hodnefield et al. | Mar. 16, 1937 |
| 2,704,732 | Copeman et al. | Mar. 22, 1955 |

FOREIGN PATENTS

| | | |
|---|---|---|
| 1,065,465 | Bessonneau | Mar. 26, 1954 |
| 210,323 | Australia | Sept. 11, 1957 |

OTHER REFERENCES

King: Chemicals Evaluated as Insecticides, U.S. Dept. of Agr. Handbook, No. 69, p. 326, May 1954.